United States Patent
Wirth et al.

(10) Patent No.: US 6,808,378 B2
(45) Date of Patent: Oct. 26, 2004

(54) DEVICE FOR THE PRODUCTION OF MOLDINGS OF PLASTIC REINFORCED WITH LONG FIBERS

(75) Inventors: Jürgen Wirth, Köln (DE); Wolfgang Pawlik, Köln (DE)

(73) Assignee: Hennecke GmbH, Leverkusen (DE)

( * ) Notice: Subject to any disclaimer, the term of this patent is extended or adjusted under 35 U.S.C. 154(b) by 331 days.

(21) Appl. No.: 09/918,165

(22) Filed: Jul. 30, 2001

(65) Prior Publication Data

US 2002/0014715 A1 Feb. 7, 2002

(30) Foreign Application Priority Data

Aug. 3, 2000 (DE) ......................................... 100 37 773

(51) Int. Cl.[7] ................................................. B29B 9/06
(52) U.S. Cl. ......................... 425/66; 425/308; 425/315; 226/97.1; 226/195
(58) Field of Search ........................... 425/66, 112, 122, 425/126.1, 308, 315, DIG. 17, DIG. 20; 226/97.1, 195

(56) References Cited

U.S. PATENT DOCUMENTS

| | | | |
|---|---|---|---|
| 3,669,328 A | 6/1972 | Castelli | 226/97 |
| 4,637,229 A | 1/1987 | Taylor, Jr. | 66/146 |
| 5,338,169 A | 8/1994 | Buckley | 425/82.1 |
| 5,447,793 A * | 9/1995 | Montsinger | 428/373 |
| 5,536,341 A * | 7/1996 | Kelman | 156/62.2 |
| 5,858,416 A | 1/1999 | Sochtig et al. | 425/117 |
| 6,065,892 A | 5/2000 | Smith | 401/209 |
| 6,251,185 B1 * | 6/2001 | Morrison et al. | 118/681 |
| 6,497,566 B2 * | 12/2002 | Dahl et al. | 425/126.1 |
| 6,527,533 B2 * | 3/2003 | Dahl et al. | 425/126.1 |
| 6,540,495 B2 * | 4/2003 | Dahl et al. | 425/126.1 |
| 6,604,927 B2 * | 8/2003 | Montsinger | 425/114 |

FOREIGN PATENT DOCUMENTS

GB  1 469 533  4/1977

* cited by examiner

Primary Examiner—Robert Davis
Assistant Examiner—Joseph S Del Sole

(57) ABSTRACT

Plastic moldings reinforced with long fibers are made without the risk of forming loops in a continuous thread or roving fed to a cutting unit at the end of a mold filling operation or tearing thereof during renewed start-up for the next molding filling operation, even at a relatively high take-off speed of the continuous thread. This is achieved by keeping the continuous thread permanently under tension pneumatically against the conveying direction. The device useful for carrying out this process is equipped with at least one tensioning air inlet in the guide for the continuous thread or roving.

6 Claims, 4 Drawing Sheets

DEVICE FOR THE PRODUCTION OF MOLDINGS OF PLASTIC REINFORCED WITH LONG FIBERS

BACKGROUND OF THE INVENTION

The present invention relates to a process for the production of moldings of plastic reinforced with long fibers in which a continuous thread or roving is taken off from a coil, conveyed via a pipeline system to a cutting unit where it is cut into finite sections which form long fibers. These long fibers are fed via a conveying channel to a free-flowing stream which forms a solid plastic and combined with the free-flowing stream. This stream of plastic-forming material combined with the long fibers is introduced into a mold, the mold is closed and the finished molding is removed from the mold after curing. The present invention also relates to a device useful for carrying out the process of the present invention.

It is known to produce moldings of plastic reinforced with long fibers by incorporating long fibers in homogeneous distribution into a liquid plastic melt before curing or into a free-flowing reaction mixture before complete reaction of such mixture. "Long fibers" as used herein means those fibers obtained by cutting continuous threads or rovings (particularly glass fiber rovings) to a finite length of preferably more than 10 mm shortly before introduction into the plastic melt or into the free-flowing reaction mixture (DE 196 18 393 A1; WO 98/01274; WO 96/35562). The ends of the continuous threads or rovings wound up on coils are linked to one another by splicing so that no interruption takes place during take-off. The continuous thread or roving is fed from the bearing seat of the coil optionally, partly through free space or through a pipeline system. A conveying air feed is introduced at one or more points in this pipeline system. The continuous thread is conveyed pneumatically with the conveying air feed to the cutting unit. The cut threads are also generally conveyed pneumatically to the location at which they are introduced into the stream of liquid plastic.

It is possible to distribute the resulting mixture of liquid plastic and long fibers manually into the lower mold half in a primitive manner, but this usually does not satisfy the technical requirements for the molding to be produced. For introduction of a liquid plastic melt to which long fibers have been added or of a reaction mixture to which long fibers have been added into an open mold, a program-controlled introducing device, e.g. a robot, which distributes the melt or mixture uniformly in the lower mold half is therefore generally used. The mold is then closed and locked. The molded article cures in the mold and is then removed from the mold.

This known process has two problems. First, during distribution of the mixture in the mold cavity, either more or fewer long fibers are required due to the movement of the introducing device. The demand for continuous thread or roving also varies accordingly. Second, feeding or conveying not only of the long fibers but also of the continuous thread or roving is interrupted from mold filling to mold filling due to the discontinuous procedure. As a result, the continuous thread is often not braked as rapidly as desired and loops of thread or roving form. To avoid such loops, tension rolls may be used. When long fibers are introduced into liquid plastic melts with a relatively long solidification time, a take-off speed of the continuous thread of from about 0.5 to approx. 2 m/s is usual. As a result, the process usually just proceeds without problems which are too great. However, malfunctions due, for example, to tearing of the continuous thread cannot be ruled out.

SUMMARY OF THE INVENTION

It is an object of this invention is to provide a process and a device in which a trouble-free feed of the continuous thread or roving, particularly at higher take-off speeds, is ensured during production of moldings of plastics reinforced with long fibers.

These and other objects of the present invention which will be apparent to those skilled in the art are accomplished by conveying a continuous thread or roving to the cutting unit under tension pneumatically in a direction opposite to the direction in which the thread or roving is conveyed to the cutting device.

DETAILED DESCRIPTION OF THE PREFERRED EMBODIMENTS

Figure 1:
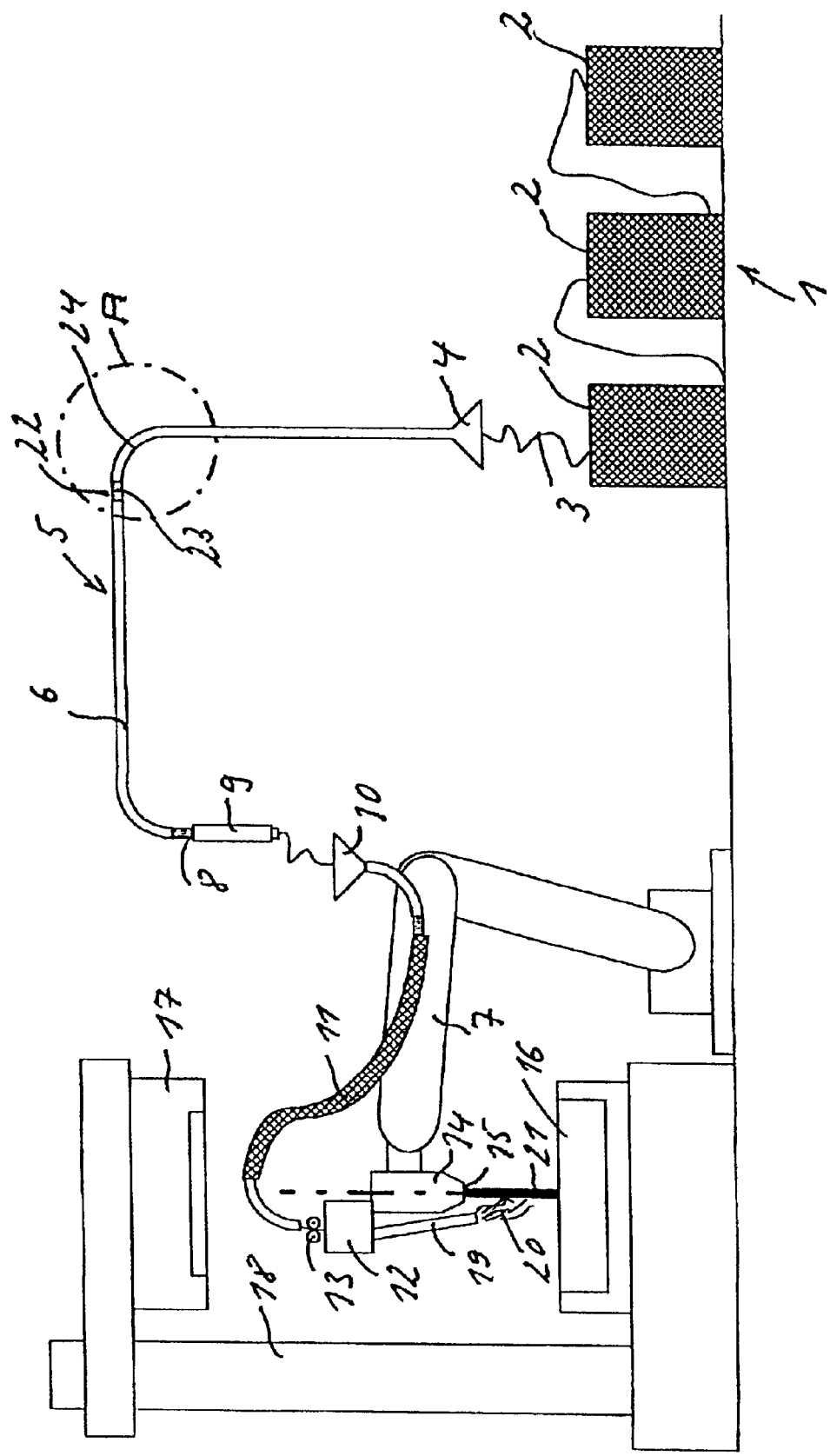
FIG. 1 illustrates a device suitable for carrying out the process of the present invention in diagram form in side view.

The present invention is directed to a process for the production of molded plastics reinforced with long fibers and to a device suitable therefor. In this process, trouble-free feed of the continuous thread or roving, particularly at higher take-off speeds, in ensured by constantly keeping the continuous thread or roving under tension pneumatically in the guide pipeline system against the conveying direction.

As a result of such pneumatic tension, braking of the continuous thread after filling of the mold does not cause loops to form. On the other hand, the constantly applied thread tension avoids a jerking stress on the continuous thread, which could lead to tearing when start-up for the next mold filling is renewed. The continuous thread advantageously also always remains pneumatically tensioned during movement of the introducing device.

The process of the present invention substantially improves production of moldings reinforced with long fibers at the known low take-off speeds of the continuous thread. At higher take-off speeds, it is indispensable for smooth operation.

According to one particular embodiment of the process of the present invention, the continuous thread is conveyed in a rigid pipeline system in the first part of the guide and passed further in a second part of the guide in a line system moved with a controlled device for introducing the stream of melt or reaction mixture with the long fibers (also referred to as the "controlled introducing device"). The tension of the continuous thread in this line system is maintained only by conveying the thread in the direction of a conveying device arranged on the controlled introducing device. It has been found that in this relatively short line system which is moved with the controlled introducing device up to the cutting unit there is no longer a risk of loop formation. The conveying device alone is sufficient for tensioning the continuous thread. Conveying air for tensioning the continuous thread in the conveying direction may optionally be introduced.

The stream which forms a solid plastic is preferably fed from the introducing device in the form of a liquid reaction mixture which has a short reaction start time.

As already stated, in the case of conventional plastic melts, the continuous threads are generally fed with a take-off speed of from about 0.5 to approx. 2.0 m/s.

The continuous threads are advantageously fed at a speed of at least 2.0 m/s to the plastic melt or reaction mixture in the process of the present invention.

At higher take-off speeds, in fact, not only is the risk of formation of loops during braking of the continuous thread substantially increased, but during renewed start-up, the continuous thread is suddenly pulled jerkily after the loops have unwound. The connecting points, usually formed by splicing, of the end of one coil with the start of the next coil, in particular, form weak points which the continuous thread can preferentially tear. In this context, the process of the present invention proves particularly advantageous due to the constant tensioning of the continuous thread. In the production of moldings from reaction mixtures such as mixtures of isocyanate and polyol to produce foamed polyurethane moldings, take-off speeds of from more than 2.0 m/s to about 15 m/s must be used so that the introduction of the long fibers will take place before the reaction start time of this reaction mixture has elapsed and the long fibers can be distributed homogeneously in the reaction mixture. In the same way, the process of the present invention is also advantageous for processing rapidly solidifying plastic melts because the long fibers must be incorporated rapidly in both cases. In the case of plastic melts, the introduction of the long fibers must take place during the liquid phase.

The device of the present invention useful for the production of moldings of plastic reinforced with long fibers in a mold is based on a bearing seat for coils of continuous threads or rovings. A guide for the continuous thread leads from the bearing seat to a movement-controlled introducing device for a liquid stream which forms a solid plastic and ends at a cutting unit with a conveying device. The guide for the continuous thread or roving is at least partly composed of a rigid pipeline system.

A key feature of the device of the present invention is the rigid pipeline system which has at least one air inlet directed against the conveying direction for pneumatic tensioning of the continuous thread or roving.

The spatial guide for the continuous thread or roving may also include eyes through which it is guided freely through the space to the cutting unit. However, a pipeline system is indispensable for pneumatic tensioning of the continuous thread or roving against the conveying direction, so that the stream of air for pneumatic tensioning is fed in a forced manner. As a result, it is possible for the first time for the continuous thread or roving always (i.e. also during the pause times between two mold filling operations) to remain tensioned or to be under pneumatic tension at the start of the next mold filling operation. If conveying is interrupted towards the end of the mold filling, the conveying device stops with a delay. Because conveying of the continuous thread or roving still continues during this period, loops could form in the pipeline system. However, these are avoided by the tensioning. On renewed start-up of the cutting unit or conveying device, there could be a sudden jerk in the case of a non-tensioned continuous thread or roving after any loops formed have been taken up, which could lead to tearing, in particular at connecting points of thread ends. Both phenomena, which occur in particular at higher take-off speeds of the continuous thread or roving in known processes, are avoided by the permanent pneumatic thread tensioning present during operation of the device of the present invention.

According to an advantageous embodiment of the device of the present invention, the guide for the continuous thread or roving to the movement-controlled introducing device may be a flexible guide hose connected to the rigid pipeline system. This embodiment enables the guide hose to be adapted to the movements of the introducing device.

In another embodiment of the present invention, the part of the guide arranged on the introducing device is separated from the remaining rigid pipeline system and has at its intake a funnel into which the continuous thread runs during the mold filling operation. The part of the guide arranged on the introducing device may be a rigid guide tube or a flexible guide hose. The funnel has a diameter such that the funnel collects the arriving continuous thread or roving even at an extreme position or movement of the introducing device.

If the guide to the introducing device is a flexible guide hose, the flexible guide hose is preferably connected to the rigid pipeline system and has a length which compensates for the movements of the introducing device. This embodiment is particularly favorable because a worn guide hose can be readily replaced with few manual operations.

As a rule, it is unavoidable that the rigid pipeline system will have pipe bends (24). In this case, a further air inlet for pneumatic tensioning of the continuous thread or roving is preferably arranged at least behind one of the pipe bends (24). This prevents the continuous thread or roving from looping in the pipe bends (24).

The guide for the continuous thread or roving preferably has at least one conveying air inlet.

During set-up for operation of the device of the present invention, troublesome threading of the continuous thread or roving by hand is eliminated and threading without problems is achieved by the pneumatic conveying air, until the conveying device on the cutting unit takes it up. During set-up, pneumatic thread tensioning against the conveying direction is not necessary. During normal operation, pneumatic conveying is not absolutely necessary during mold filling.

The end of the rigid pipeline system preferably has a telescopic tube which can be moved out as far as the subsequent funnel during setup. This embodiment is particularly advantageous for threading carried out in connection with a conveying air inlet of the pipeline system, so that the continuous thread or roving is conveyed without difficulty to the cutting unit, until the conveying device arranged there takes it up. Here also, no tensioning of the continuous thread or roving is necessary during set-up.

The device of the present invention is shown in two embodiment examples in the drawings and is described in more detail below.

Figure 2:
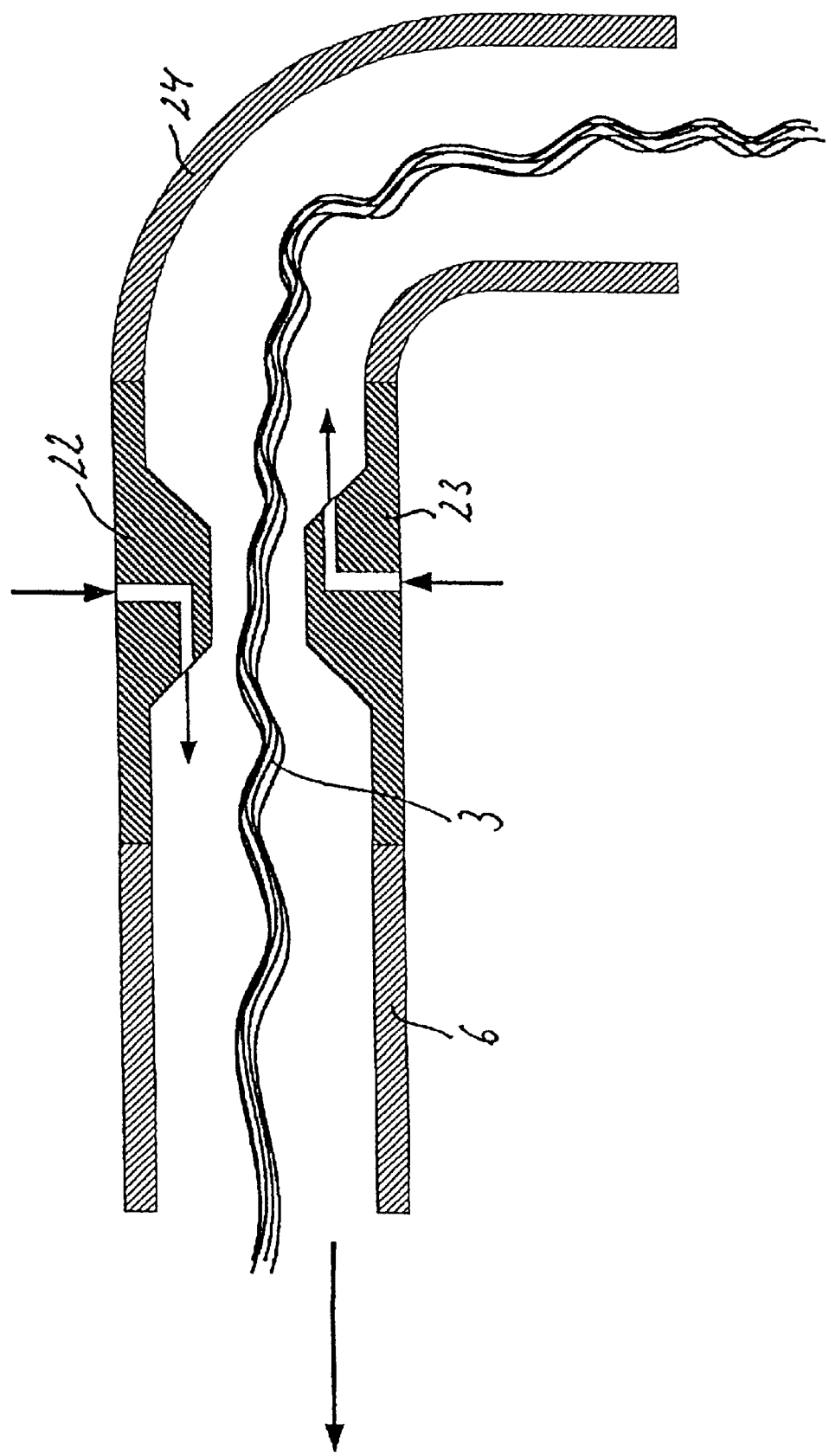
FIG. 2 illustrates detail A in FIG. 1 on a magnified scale.
Figure 3:
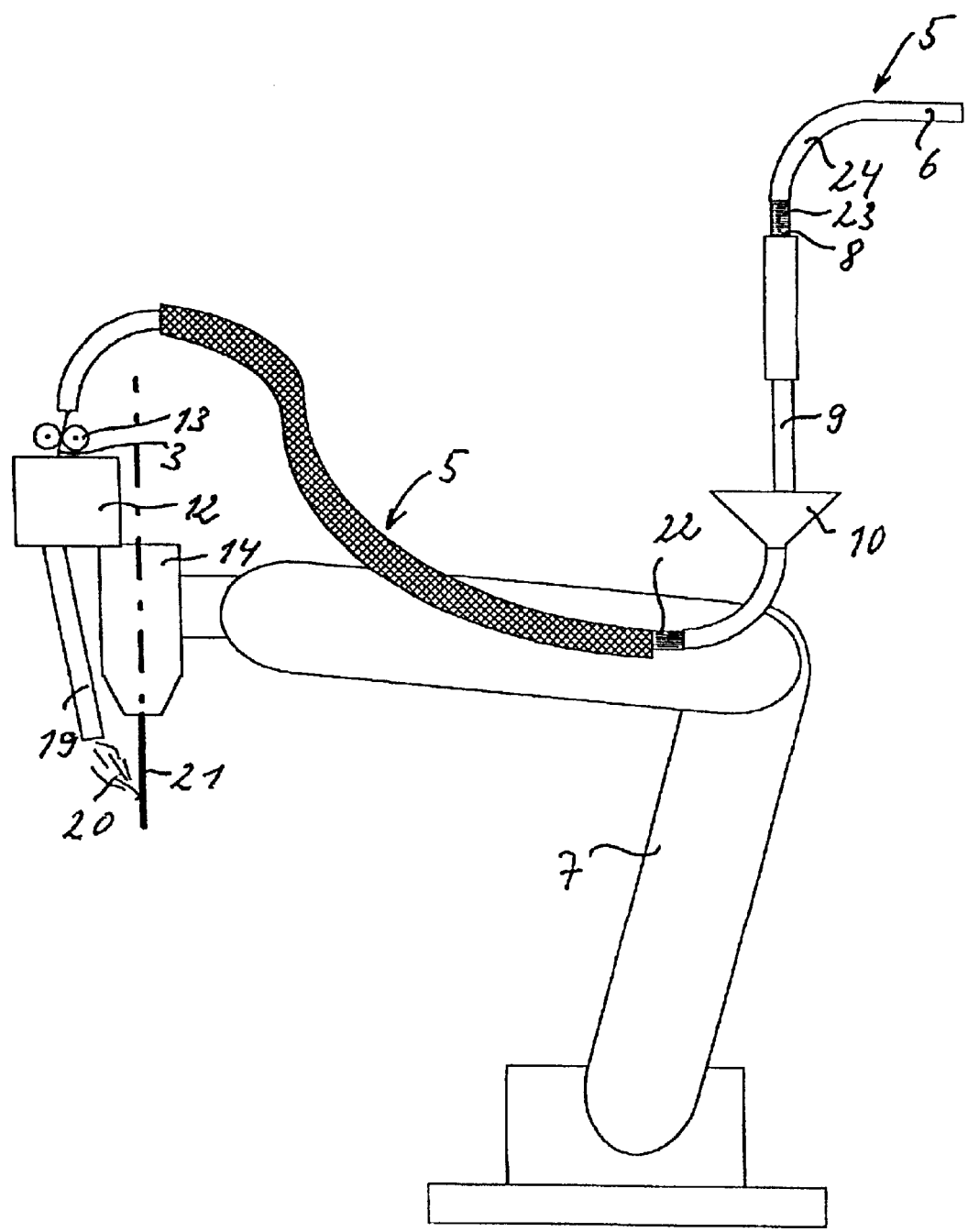
FIG. 3 illustrates an introducing device useful in the practice of the present invention and the transition from the end of the rigid pipeline system of FIG. 1 on a magnified scale.

In FIGS. 1, 2 and 3, the device includes a bearing seat 1 for several coils 2 of continuous threads 3 in the form of glass fiber rovings. A continuous thread 3 passes via a funnel 4 into a guide 5, the first part of which is a rigid pipeline system 6, which leads through free space to an introducing device 7 which can be moved in a controlled manner and can be swivelled out laterally. At the outlet end 8 of the rigid pipeline system 6 is arranged a telescopic tube 9 which during set-up can be lowered down to a funnel 10. The funnel 10 has a diameter such that the arriving continuous thread 3 is always collected even during extreme movements of the introducing device 7. Connected to this funnel 10 is the guide 5, constructed of a flexible guide hose 11, which leads to a cutting unit 12 provided with a conveying device 13. The introducing device 7 is equipped with a mixing head 14 for the foam-forming reaction components of polyol and isocyanate. The feeds of these reaction components, which are known to those in the art are not shown. The mixing head 14 has an outlet opening 15 which points into the lower mold half 16 of an open mold. The upper mold half 17 is held on guide shaft 18 such that it can be lowered. From the cutting unit 12, a guide tube 19 for the long fibers 20 cut from the continuous thread 3 leads in the direction of the stream 21 of the reaction mixture emerging from the outlet opening 15. Both the rigid pipeline system 6 and the flexible guide hose 11 have conveying air inlets 22 pointing in the conveying direction. The rigid pipeline system 6 is also provided with tensioning air inlets 23.

Figure 4:
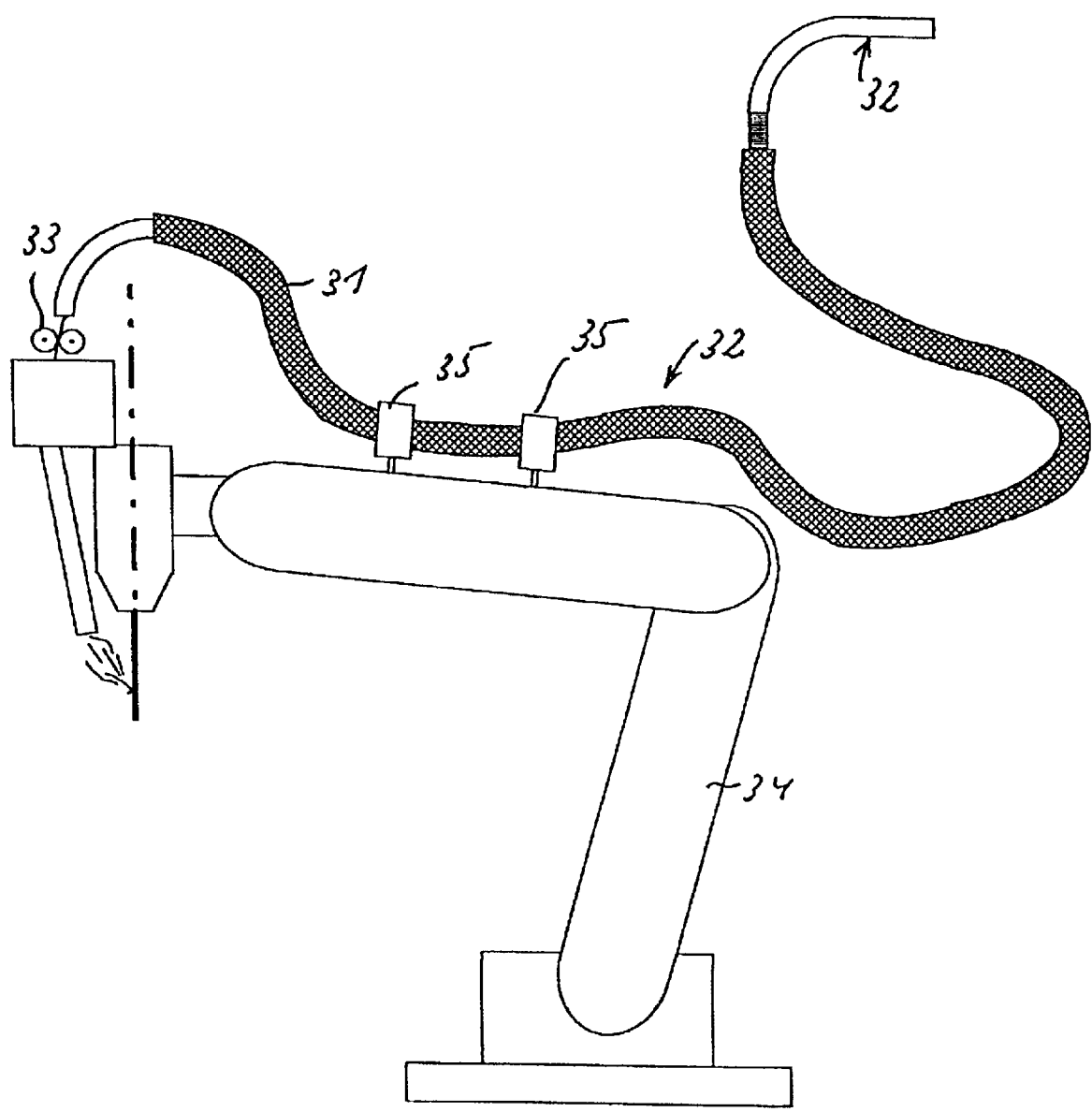
FIG. 4 illustrates another embodiment of the transition from the end of the rigid pipeline system in a device suitable for carrying out the process of the present invention.

The device illustrated in FIG. 4 is constructed in exactly the same way as that shown in FIGS. 1, 2 and 3 with the exception that guide 32 for the continuous thread or roving to conveying device 33 constructed of flexible guide hose 31 is arranged on the introducing device 34 by means of holding eyes 35 in a manner such that and is of a length such that this guide hose 31 can also compensate for the extreme movements of introducing device 34. This flexible guide hose is connected directly to the rigid pipeline system 35.

EXAMPLE

The device illustrated in FIGS. 1, 2 and 3 was employed. For starting up, i.e. during set-up, the continuous thread 3 was fed manually, with the conveying air feed switched on, into the funnel 4, and was taken up by the stream of air and conveyed until it was taken up by the conveying device 13 on the cutting unit 12. The pneumatic conveying air was then switched off and the system was switched over to the mold filling operation. A reaction mixture of polyol and isocyanate for a mold filling was produced in the mixing head 14 in a so-called shot process. This mixture had a reaction start time of about 15 seconds. Within this time, the long fibers 20 of 15 mm length cut by the cutting unit 12 were introduced into the mixture stream in an amount such that the long fibers would be present in an amount of 25 percent by weight based on total weight of the finished molding. The continuous thread 3 was therefore fed with a take-off speed of 4.0 m/s. A stream of air acted against the conveying operation for permanent tensioning of the continuous thread 3 with a force of 1.5 N. The introducing device 7 was program-controlled in its movement so that the introduction into the lower mold half 16 took place homogeneously. When the lower mold half 16 had been filled, both the mixing head 14 and the conveying device 13 were switched off. Running-on of the continuous thread 3, which could form undesirable loops, was avoided here by the tensioning thereof. The introducing device 7 was swivelled out laterally and the upper mold half 17 was lowered and mounted on the lower mold half 16. The two mold halves were then locked together. After curing, the molding reinforced with long fibers 20 was removed from the mold. Both the conveying device 13, the cutting unit 12 and the production of the reaction mixture in the mixing head 14 were then started up again for the next mold filling operation. Since the conveying device 13 was accelerated during start-up and the continuous thread 3 was under tension, a sudden jerk, during which the continuous thread 3 could have torn, was prevented. The subsequent mold filling operations then proceeded in the same manner.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device useful for the production of a plastic molding reinforced with long fibers in a mold comprising:
    a) a bearing seat for coils of continuous threads or rovings,
    b) a guide for the continuous thread or rovings which leads the threads or rovings from the bearing seat to a movement-controlled introducing device and ends at a cutting unit,
    c) the movement-controlled introducing device for introducing a liquid stream which forms a solid plastic with long fibers comprising a flexible guide hose connected to a rigid pipeline system,
    d) the cutting unit, and
    e) a conveying device on the cutting unit in which the guide for the continuous thread or roving at least partly comprises
    f) the rigid pipeline system having at least one tensioning air inlet directed against the conveying direction for pneumatic tensioning of the continuous thread or roving.

2. The device of claim 1 in which the guide on the introducing device has an intake funnel into which the continuous thread or roving runs during the mold filling operation.

3. The device of claim 1 in which the flexible guide hose has a length which compensates for any movement of the introducing device.

4. The device of claim 1 in which the rigid pipeline system has pipe bends and an air inlet for tensioning the continuous thread or roving is arranged behind at least one of the pipe bends.

5. The device of claim 1 in which the guide has at least one conveying air Inlet.

6. The device of claim 2 in which the end of the rigid pipeline system has a telescopic tube which during set-up can be moved as far as the intake funnel.

* * * * *